US009773034B1

(12) United States Patent
Smith et al.

(10) Patent No.: US 9,773,034 B1
(45) Date of Patent: Sep. 26, 2017

(54) LARGE-SCALE LOG INDEX

(71) Applicant: Amazon Technologies, Inc., Seattle, WA (US)

(72) Inventors: Patrick Devere Smith, Seattle, WA (US); Zachary Ganwise Fewtrell, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 973 days.

(21) Appl. No.: 13/763,130

(22) Filed: Feb. 8, 2013

(51) Int. Cl.
*G06F 7/00* (2006.01)
*G06F 17/30* (2006.01)

(52) U.S. Cl.
CPC .. *G06F 17/30321* (2013.01); *G06F 17/30336* (2013.01); *G06F 17/30551* (2013.01)

(58) Field of Classification Search
CPC ........... G06F 17/30551; G06F 17/3089; G06F 17/30619
USPC ................................ 707/746, 999.2, 999.101
See application file for complete search history.

(56) References Cited

U.S. PATENT DOCUMENTS

| 2002/0138762 | A1* | 9/2002 | Horne | H04L 12/2602 726/25 |
| 2006/0020616 | A1* | 1/2006 | Hardy | G06F 17/30619 |
| 2007/0033233 | A1* | 2/2007 | Hwang | G06F 17/3089 |

* cited by examiner

*Primary Examiner* — James Trujillo
*Assistant Examiner* — John J Morris
(74) *Attorney, Agent, or Firm* — Lee & Hayes, PLLC

(57) ABSTRACT

A large-scale service utilizes service hosts that generate log files describing aspects of their operation. An indexing service obtains the log files from a log store and/or obtains log data directly from the service hosts. The indexing service also searches the log files for key values and other associated values. The indexing service utilizes a database service to store located key values and the other values in a log index. A user interface component provides functionality for searching the log index for key values and displaying the other values associated with the key values. An application programming interface (API) might also be utilized to query the log index for key values and to thereby obtain the other associated values.

20 Claims, 13 Drawing Sheets

(12)  United States Patent

LARGE-SCALE LOG INDEX

BACKGROUND

Large-scale World Wide Web ("Web") services commonly utilize many thousands of server computers and/or virtual machine instances (which may be referred to herein as "service hosts") to service client requests. In such a large-scale service, it is common for the service hosts to generate log files ("logs") that include data describing various aspects of their operation. For example, service hosts might create service logs containing data describing aspects of the processing of client requests, performance logs containing data describing one or more performance characteristics of the service hosts, and error logs containing data describing errors generated by the service hosts. The service hosts might also generate other types of logs containing other types of information.

The volume of log files generated can be enormous when, as described above, multiple thousands of service hosts are utilized to implement a service. For example, if a large-scale service is implemented using several thousand service hosts, it would not be unusual for the service hosts to generate several hundred gigabytes ("GB") of log files per hour. It can be extremely time consuming to locate data of interest in such a large set of data. This can be particularly frustrating for an administrator of such a large-scale service when quick access to data in the log files is needed to assist with addressing a problem condition.

It is with respect to these and other considerations that the disclosure made herein is presented.

DETAILED DESCRIPTION

Figure 1:
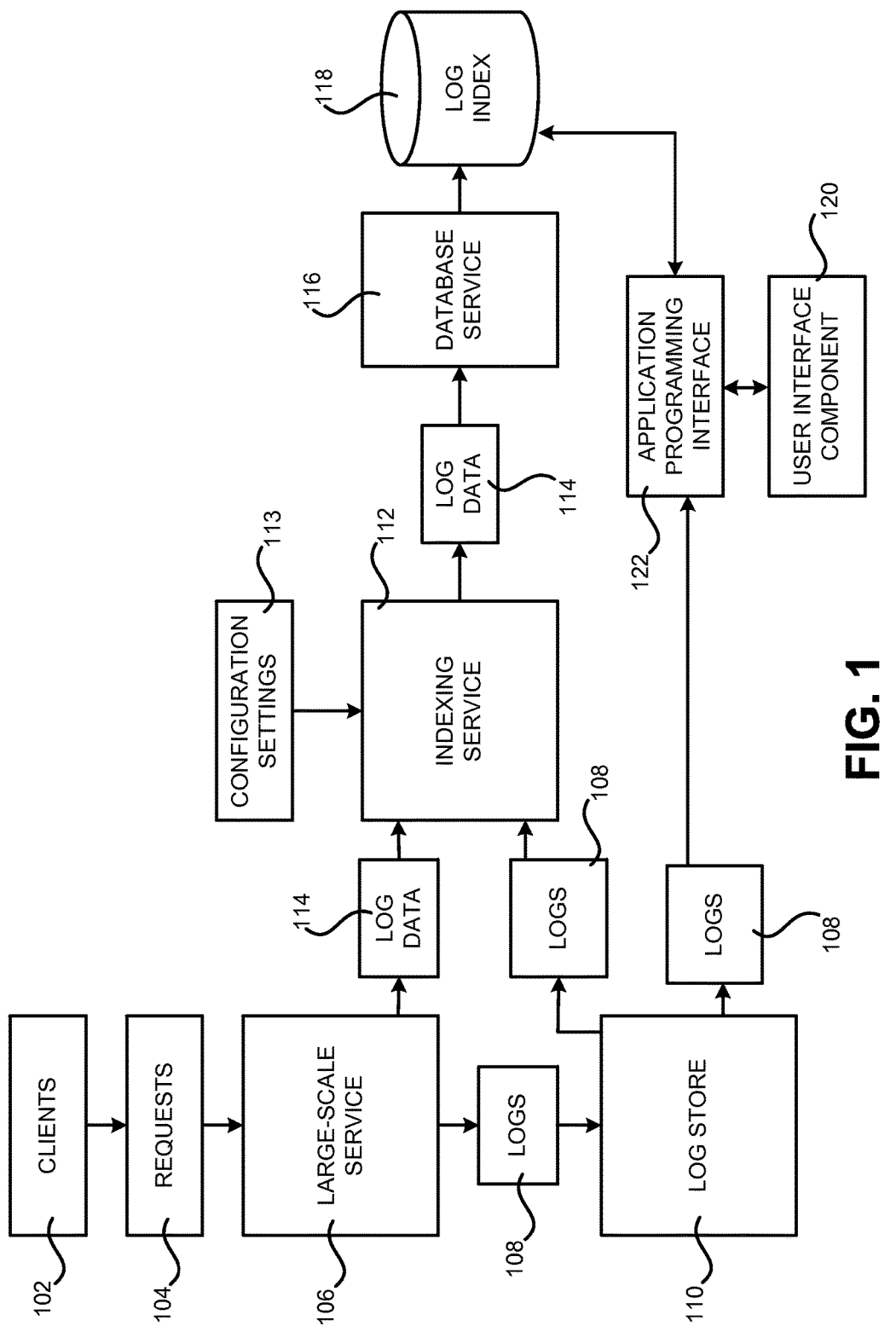
FIG. 1 is a system diagram showing various components disclosed herein for providing a large-scale log index, according to one embodiment disclosed herein.

The following detailed description is directed to technologies for providing and utilizing a large-scale log index. Through an implementation of the technologies disclosed herein, a log index can be generated that permits quick access to the data contained in large volumes of log files generated by service hosts in a large-scale service. For example, a user interface component or an application programming interface ("API") might utilize the contents of the log index to allow an administrator of the large-scale service to quickly locate information of interest contained in the log files.

According to aspects presented herein, a large-scale service is implemented utilizing a number of service hosts. For example, the large-scale service might be implemented utilizing thousands or even tens of thousands of service hosts. The service hosts might be hardware computing devices or virtual machine instances ("instances") configured to receive and process client requests.

As discussed above, the service hosts might also be configured to generate log files containing data describing aspects of their operation. For example, and as mentioned briefly above, the service hosts might create service logs containing data describing aspects of the processing of client requests, performance logs containing data describing the performance characteristics of the service hosts, and/or error logs containing data describing errors generated by the service hosts. The service hosts might also generate other types of logs containing other types of information. The logs might be expressed using human readable (e.g. text) or machine-readable (e.g. binary) formats. The logs might be stored in a centralized distributed log store or in another type of data store. The logs might also be stored on a periodic basis, such as once per hour or other time period.

As also described above, the volume of log files generated can be enormous when thousands or tens of thousands of service hosts are utilized to implement the service. For example, if a large-scale service is implemented using several thousand service hosts, the service hosts may generate several hundred GBs of log files per hour. The technologies presented herein allow an administrator of such a large-scale service to quickly locate desired entries in the log files generated by the service hosts, even when hundreds of GBs of log data are present.

In order to provide this functionality, an indexing service is utilized in one embodiment. The indexing service is configured to periodically retrieve the log files and to search the log files for specified key values. The key values to be located may be specified in a configuration settings file. For example, an administrator of the large-scale service might specify that the key value is a unique request identifier ("ID") associated with each client request. Other types of key values might also be specified, such as a client ID, a host ID, or another type of data contained in the log files. The key values might be specified using a regular expression or in another fashion.

The indexing service might also be configured to identify other values when a key value is encountered in one of the log files. For example, the configuration settings file might instruct the indexing service to obtain one or more other values from the log file when a key value is identified. When the key value is a request ID, for example, the indexing service might also be configured to obtain the filename of the log file in which a request ID was located, a host ID that processed the request corresponding to the request ID, the time the request associated with the request ID was processed, and an offset (e.g. a byte offset) into the log file to the location where the request ID was located. Other types of values might also be specified. These other values might also be specified utilizing a regular expression or in another manner.

When the indexing service identifies key values and other values in a log file, the indexing service provides the located log data to a database service for storage in the log index. The log index may be stored as a relational database, or another type of data store, that permits searching based upon the key values. In this way, the indexing service can generate and store a log index that can be utilized to quickly identify data of interest in the log files generated by the service hosts.

In some implementations, the service hosts are also configured to provide certain log data to the indexing service directly and in real, or near-real time. Rather than provide the entire log files directly to the indexing service, however, the service hosts might be configured to provide only key values and other relevant values to the indexing service. When the indexing service receives the log data from the service hosts, it causes the database service to store the log data in the log index in the manner described above. In this embodiment, the log index might be utilized to locate data within log files almost immediately after the service host has generated the log data.

In some implementations, a user interface component is also provided for retrieving data stored in the log index. For example, the user interface component might provide a user interface through which a user may submit a key value. In one particular implementation, for instance, a user might provide a particular request ID of interest. In response to receiving a key value, the user interface component is configured to cause a search to be made of the log index for the specified key value. If the key value is located in the log index, the user interface component will present the other values stored in the log index that have been associated with the supplied key value. For instance, if a request ID is provided as the key value, the user interface component might display the filename of the log file in which the request ID was located, the host ID that processed the request associated with the request ID, the time at which the request associated with the request ID was processed, and/or the offset from the start of the log file to the location of the request ID. The user interface component might also provide other types of functionality described below.

In some implementations, an application programming interface ("API") is also provided for retrieving values from the log index. For example, the API might expose a method through which a key value can be submitted. In response to receiving a key value, the API will cause a search to be made of the log index for the specified key value. If the key value is located in the log index, the API will return the other values associated with the supplied key value. The API might also provide other types of functionality described below. In one embodiment, the user interface component utilizes the API to retrieve data stored in the log index. Additional details regarding these and other aspects of the embodiments disclosed herein will be provided below with regard to FIGS. 1-12.

It should be appreciated that the embodiments disclosed herein might be utilized with any type of computer, computing system, device, application program, operating system, or other type of system or component. It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that various aspects of the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief overview of one mechanism disclosed herein for providing and utilizing a log index 118 in conjunction with the operation of a large-scale service 106. Additional details regarding the various components shown in FIG. 1 will be provided below with regard to FIGS. 2-12.

As shown in FIG. 1, a large-scale service 106 is configured to receive and process requests 104 received from clients 102. As discussed above, the large-scale service 106 might be implemented using hundreds, thousands, or even tens of thousands of service hosts. Each of the service hosts may be a server computer or anther type of hardware device and/or a virtual machine instance configured to process client requests 104 in a particular manner. In addition to processing the client requests 104, each of the service hosts might also be configured to generate one or more logs 108 describing aspects of their operation. The logs 108 might be stored in a centralized distributed log store 110 or in another type of data store. The logs might be expressed using human readable or machine-readable formats. The service hosts might also store the logs on a periodic basis, such as once per hour or other time period.

In order to facilitate access to the contents of the logs 108, an indexing service 112 is utilized in one embodiment. The indexing service 112 is configured to periodically retrieve the logs 108 from the log store 110, and to search the logs 108 for specified key values. The key values to be located may be specified in a configuration settings file 113. For example, an administrator of the large-scale service 106 might specify that the key value is a unique request ID that is associated with each client request 104. Other types of values in the logs 108 might also be specified as key values. The key values might be specified using a regular expression or in another fashion.

The indexing service 112 might also be configured to identify other values when a key value is encountered in one of the logs 108. For example, the configuration settings file 113 might instruct the indexing service 112 to obtain one or more other values from a log 108 when a key value is identified. These other values might also be specified utilizing a regular expression or in another manner.

The service hosts in the large-scale service 106 might also be configured to provide log data 114 to the indexing service 112 directly and in real time, or near-real time, in some embodiments. When the indexing service 112 receives the log data 114 from the service hosts, it causes the database service 116 to store the log data 114 in the log index 118 in the manner described above. In this embodiment, the log index 118 might be utilized to locate data within logs 108 almost immediately after a service host has generated the log data 114. Additional details regarding the configuration and operation of the large-scale service 106, the service hosts, the log store 110, the logs 108, and the configuration of the indexing service 112 will be provided below with regard to FIGS. 2-5.

When the indexing service 112 identifies key values and/or other associated values in a log 108, the indexing service 112 provides the located log data 114 to a database service 116 for storage in the log index 118. The log index 118 may be stored as a relational database, or another type of data store, that permits searching based upon the key values. In this way, the indexing service 112 can store data in the log index 118 that can be utilized to quickly identify data of interest in the logs 108 generated by the service hosts in the large-scale service 106. Additional details regarding the operation of the indexing service 112 and the database service 116 will be provided below with regard to FIGS. 6 and 7.

In some embodiments, a user interface component 120 is also provided for retrieving data stored in the log index 118. For example, the user interface component 120 might provide a user interface through which a user may submit a key value. In response to receiving the key value, the user interface component 120 is configured to cause a search to be made of the log index 118 for the specified key value. If the key value is located in the log index 118, the user interface component 120 will retrieve and present the other values stored in the log index 118 that have been associated with the supplied key value. For instance, if a request ID is provided as the key value, the user interface component 120 might display the filename of the log 108 in which the request ID was located. A user can then utilize the filename to retrieve the log 108 containing the desired information. In some embodiments, the user interface component 120 can retrieve and display the contents of the logs 108 using a supplied key value.

In some embodiments, an API 122 is also provided for retrieving values from the log index 118. For example, the API 122 might expose a method through which a key value can be submitted. In response to receiving a key value, the API 122 will cause a search to be made of the log index 118 for the specified key value. If the key value is located in the log index 118, the API 122 will return the other values that have been associated with the supplied key value. The API 122 might also provide functionality for returning portions of the log 108 that include the supplied key value. In some implementations, the user interface component 120 utilizes the API 122 to retrieve values stored in the log index 118. Additional details regarding the operation of the user interface component 120 and the API 122 will be provided below with regard to FIGS. 8-11.

Figure 2:
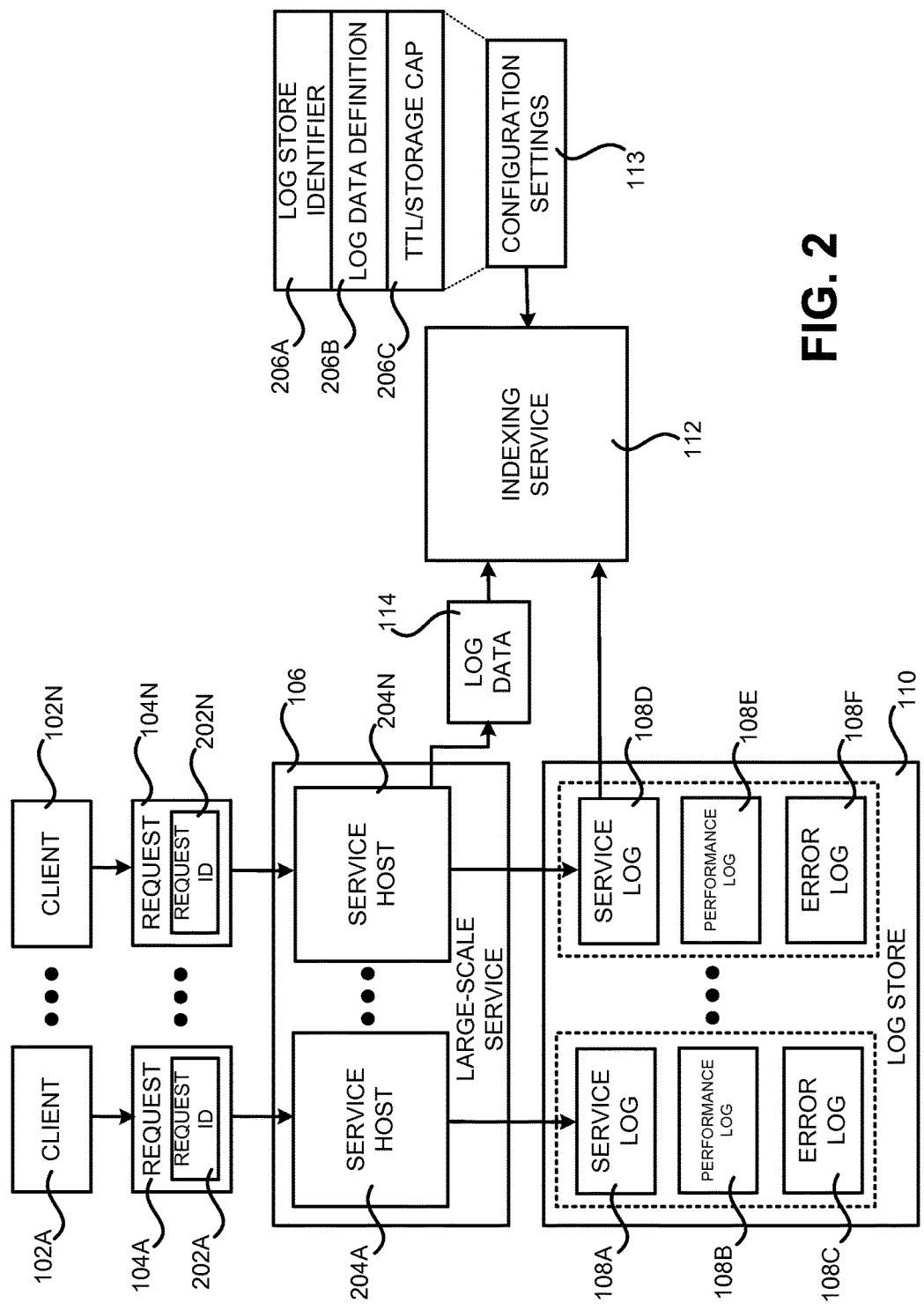
FIG. 2 is a system diagram showing additional details regarding the operation of service hosts utilized to implement a large-scale service and the operation of an indexing service utilized to index log files generated by the service hosts, according to one embodiment disclosed herein.

Referring now to FIG. 2, additional details will be provided regarding the configuration and operation of the large-scale service 106, the service hosts, the log store 110, the logs 108, and the configuration of the indexing service 112. As shown in FIG. 2, the large-scale service 106 may be implemented utilizing a number of service hosts 204A-204N. As mentioned briefly above, the service hosts 204 might be computing devices and/or instances configured to receive and respond to service requests 104A-104N received from the clients 102A-102N, respectively. As shown in FIG. 2, each request 104A-104N might include a unique request ID 202A-202N, respectively, that uniquely identifies the associated request. A request ID 202 might be a globally unique identifier ("GUID") or another type of data that uniquely identifies a request 104. In this regard, it should be appreciated that it is not strictly necessary for each and every request ID 202 to be unique.

As also shown in FIG. 2, each of the service hosts 204A-204N may be configured to store logs 108 in the log store 110. For instance, in the specific example shown in FIG. 2, the service host 204A is configured to create a service log 108A containing data describing aspects of the processing of client requests, a performance log 108B containing data describing one or more performance characteristics of the service host 204A, and an error log 108C containing data describing errors generated by the service host 204A. The service host 204N is similarly configured to generate a service log 108D, a performance log 108E, and an error log 108F. The service hosts 204A-204N might also generate other types of logs 108 containing other types of information in other implementations.

In one embodiment, the log store 110 is a centralized distributed log store. It should be appreciated, however, that other implementations might be utilized. For example, network file shares, distributed storage services, and other types of data stores might also be utilized to store the logs 108. The only requirement is that log store 110 be configured to support connections by other services, such as the indexing service 112, for retrieving the logs 108. Details regarding the processing of the logs 108 by the indexing service 112 will be provided below.

As described briefly above, the service hosts 204 might be configured to transmit log data 114 directly to the indexing service 112 in some embodiments. In these embodiments, the service hosts 204 might be configured to transmit the log data 114 to the indexing service 112 in real time, or in near-real time. Moreover, the service hosts 204 might be configured to transmit only a certain subset of the logs 108 to the indexing service 112. For example, the service hosts 204 might be configured to transmit only a request ID, the filename of the log file 108 in which the request ID is stored, and potentially one or more other values of interest to the indexing service 112 in real time. In this way, the indexing service 112 can get real or near-real time access to certain parts of the log files 108. The indexing service 112 can index the remainder of the log files 108 once the service hosts 204 commit the log files 108 to the log store 110.

As also described briefly above, various aspects of the operation of the indexing service 112 might be configured through the use of the configuration settings file 113. In particular, the configuration settings file 113 might include a field 206A that stores data identifying the location and/or connection protocol for accessing the log store 110. The configuration settings file 113 might also include a field 206B specifying a key value and one or more other values that are to be retrieved from the logs 108. As mentioned above, for example, an administrator of the large-scale service 106 might specify data in the field 206B indicating that the key value is a unique request ID that is associated with each client request 104. Other types of values in the logs 108 might also be specified as key values. The key values might be specified using a regular expression or in another fashion. The field 206B might also specify data identifying one or more other values to be retrieved from the logs 108, or potentially another location, when a key value is encountered in one of the logs 108. These other values might also be specified utilizing a regular expression or in another manner.

In some implementations, the configuration settings file 113 also includes field 206C defining a time to live ("TTL") value or a storage cap for the data retrieved from the logs 108 and stored in the log index 118. As will be discussed in greater detail below, the TTL value and/or the storage cap might be utilized to expire log data 114 stored in the log index 118 after a certain period of time or when a certain volume of data has been stored in the log index 118. It should be appreciated that the format and content of the configuration settings file 113 illustrated in FIG. 2 are merely illustrative, and that many other aspects of the operation of the indexing service 112 might be specified in a similar manner.

Figure 3:
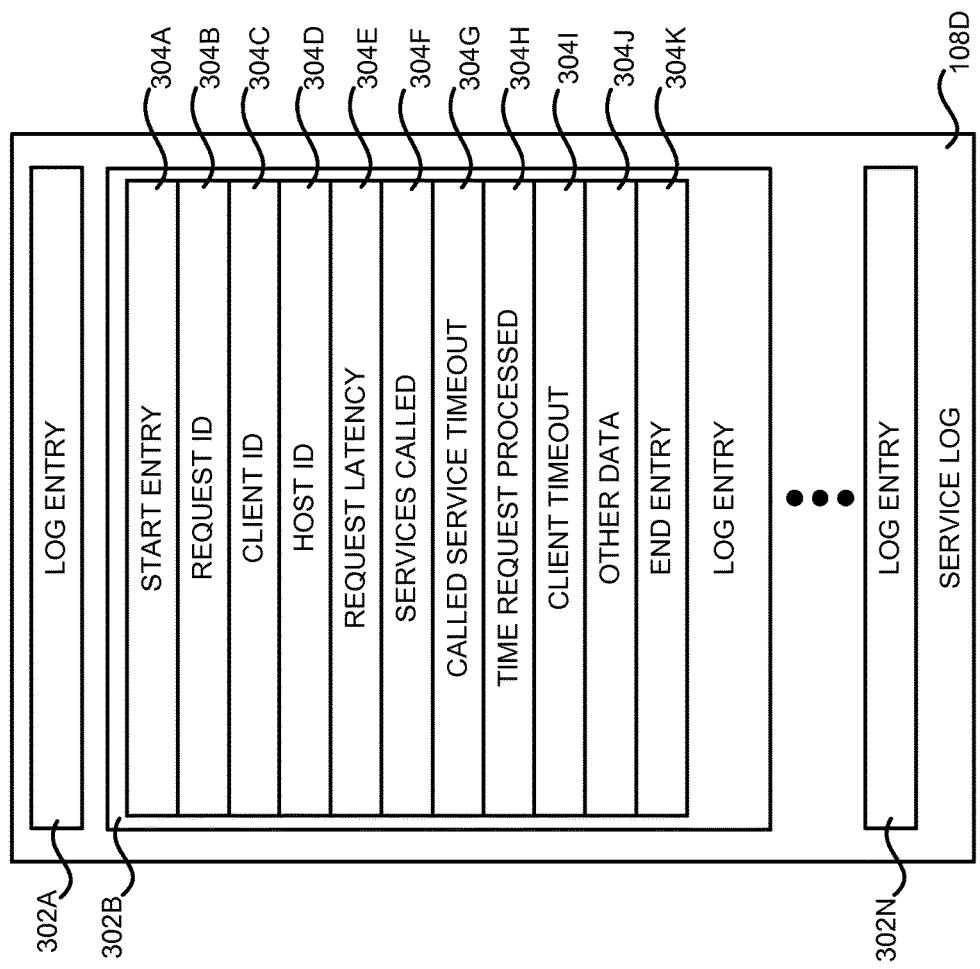
FIG. 3 is a data structure diagram illustrating additional aspects regarding the configuration of a service log generated by a service host, according to one embodiment disclosed herein.

FIG. 3 shows one illustrative format for a service log 108D. In particular, and as illustrated in FIG. 3, the service log 108D includes a number of log entries 302A-302N in one embodiment. Each of the log entries 302 includes data describing aspects of the processing of a particular client request 104. In particular, each log entry 302 includes a number of fields 304A-304K. For instance, in the example shown in FIG. 3, a field 304A is provided that specifies the start of the log entry 302B and a field 304K is provided that specifies the end of the log entry 302B.

The fields 304B-304J of the entry 302B provide other data regarding the manner in which a particular request 104 was processed. For example, the field 304B includes the request ID 202 for the corresponding request 104, the field 304C includes a client ID that identifies the client 102 that made the request, and the field 304D includes a host ID that identifies the service host 204 that processed the request. The field 304E specifies the response latency (i.e. the amount of time taken to respond to the request), the field 304F specifies whether the service host 204 that processed the request called any other services, and the field 304G specifies whether any called services timed out prior to responding. The field 304H specifies the amount of time taken to process the request and the field 304I specifies whether the client 102 timed out prior to the time the request was processed. Additionally, one or more other fields 304J might be provided that include other data regarding the processing of a request 104 by a service host 204. In this regard, it should be appreciated that the format of the service log 108D shown in FIG. 3 is merely illustrative and that other arrangements of data might be utilized.

Figures 4A, 4B:
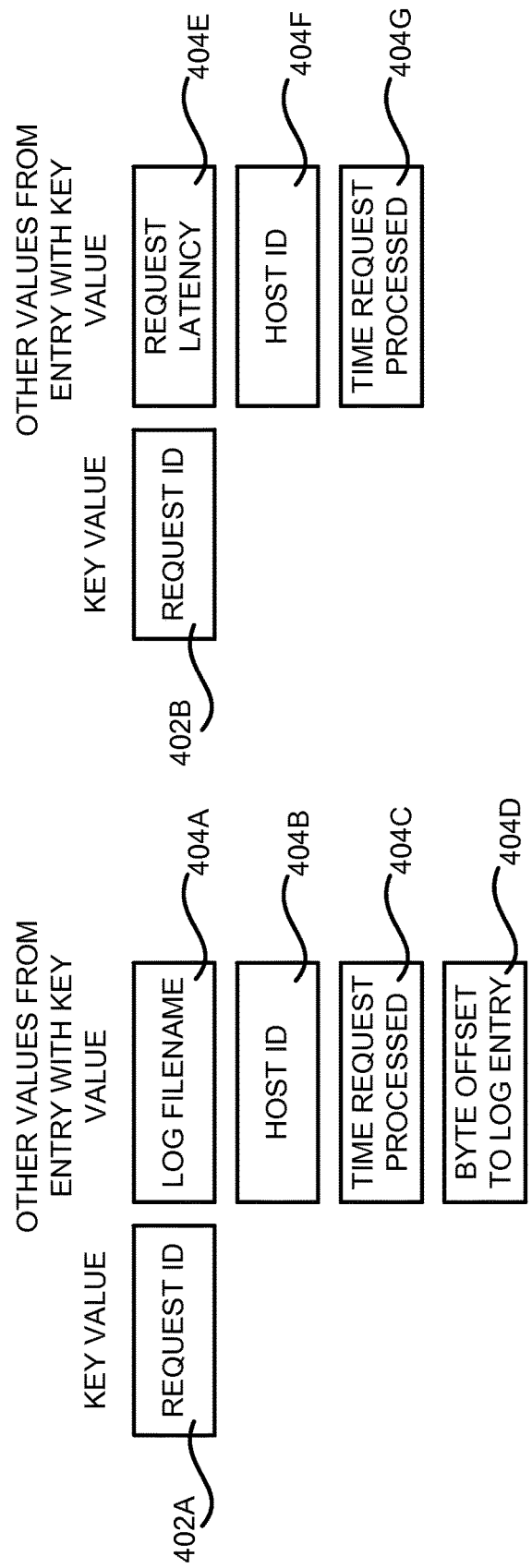
FIGS. 4A-4B are data structure diagrams showing aspects of the configuration of an indexing service for extracting various types of data from log files generated by service hosts, and for storing the data in a log index, according to one embodiment disclosed herein.

FIGS. 4A-4B are data structure diagrams showing aspects of the configuration of the indexing service 112 for extracting key values and other associated values from the log files 108 generated by the service hosts 204, and for storing the extracted data in a log index 118, according to one embodiment disclosed herein. As discussed above, the field 206B in the configuration settings file 113 may be utilized to define a key value that should be retrieved from the log files 108 in one embodiment.

In the example shown in FIG. 4A, for instance, the request ID stored in the field 304B of a service log 108 has been specified as a key value 402A. In this example, the field 206B in the configuration settings file 113 has also been defined in a manner to cause the indexing service 112 to retrieve four other values 404A-404D from the same entry 302 in which a key value 402A (i.e. a request ID) has been located. Specifically, the indexing service 112 will retrieve a value 404A corresponding to the filename of the log file 108 that the key value 402A was located in, a value 404B stored in the field 304D of the entry 302 that identifies the host ID that processed the request, a value 404C stored in the field 304H of the entry 302 indicating the time at which the request was processed, and to generate and store a value 404D identifying the offset (e.g. the byte offset) within the particular log file 108 at which the key value 402A is located. The indexing service 112 will then cause the key value 402A and the other values 404A-404D to be stored in the log index 118. The configuration shown in FIG. 4A might be useful, for example, to allow an administrator to quickly locate the log file 108 that includes a particular request ID 202.

In the example shown in FIG. 4B, a request ID stored in the field 304B of a service log 108 has also been specified as a key value 402B. In this example, however, the field 206B in the configuration settings file 113 has also been defined in a manner to cause the indexing service 112 to retrieve three other values 404E-404G from the same entry 302 in which a key value 402B (i.e. a request ID) has been located. Specifically, the indexing service 112 will retrieve a value 404E stored in the field 304E of the entry 302 that identifies the request latency, a value 404F stored in the field 304D identifying the host that processed the request corresponding to the request ID, and a value 404G stored in the field 304H indicating the time at which the request was processed. The indexing service 112 will then cause the key value 402A and the other values 404A-404D to be stored in the log index 118.

It should be appreciated that the example configurations illustrated in FIGS. 4A and 4B and described above are merely illustrative and that virtually any type of data stored in the logs 108 might be retrieved and stored in the manner described above. Additionally, it is not necessary that a request ID 202 be utilized as a key value. Rather, any of the data stored in any of the logs 108 might be utilized as a key value.

Figure 5:
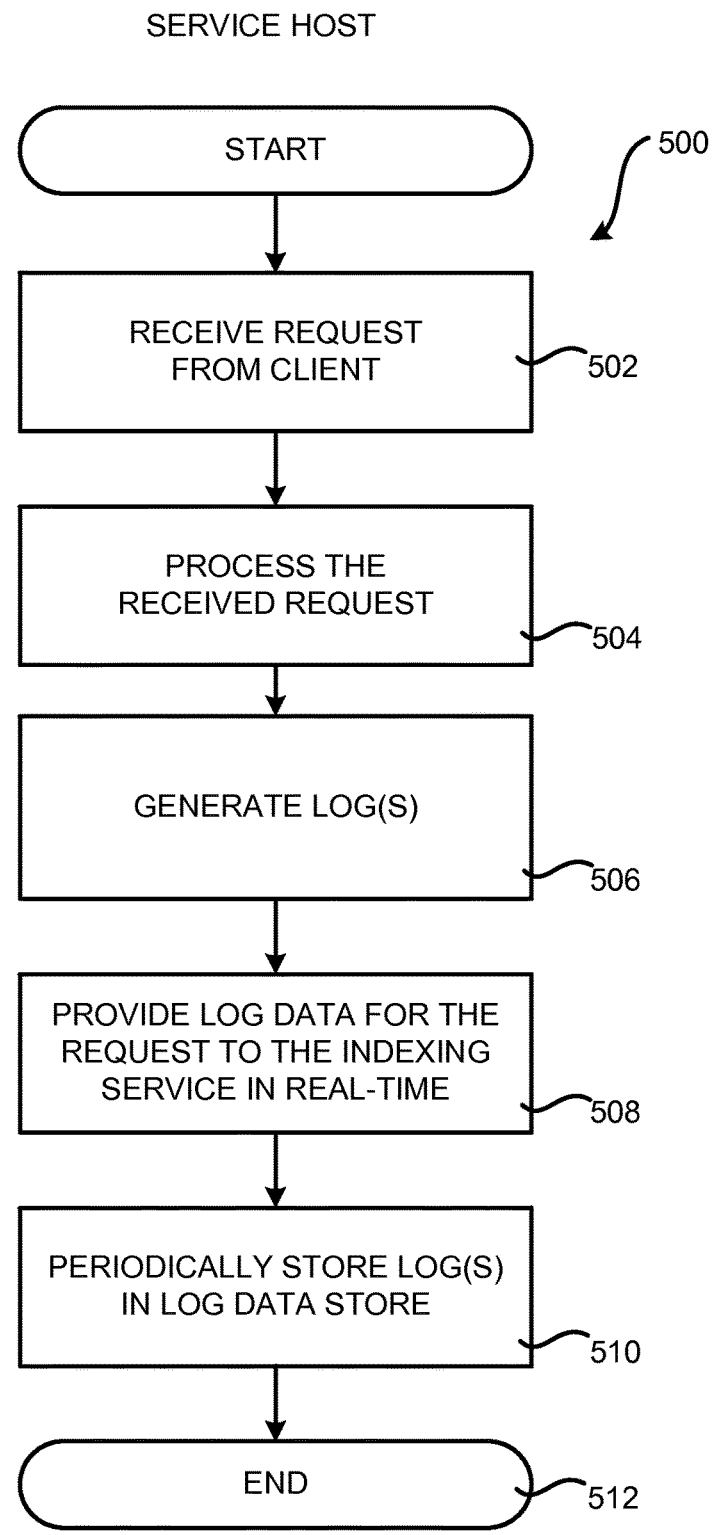
FIG. 5 is a flow diagram showing one illustrative routine describing additional aspects of a service host, according to one embodiment disclosed herein.

Turning now to FIG. 5, a flow diagram 500 will be described that illustrates various aspects of the operation of the service hosts 204, according to one embodiment disclosed herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Accordingly, the logical operations described herein with reference to the various FIGS. are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 begins at operation 502, where a service host 204 receives a request 104 from a client 102. In response to receiving such a request 104, the routine 500 proceeds from operation 502 to operation 504, where the service host 204 processes the received request 104. The nature of the processing performed at operation 502 will depend greatly on the type of service that the large-scale service 106 implements.

From operation 504, the routine 500 proceeds to operation 506, where the service host 204 generates one or more logs and/or log entries. For example, a log entry 302 might be created in service log 108 providing information regarding the processing of the request 104 that occurred at operation 504. The created log entry 302 might utilize a format similar to that shown in FIG. 3 and described above. Other types of log formats might also be utilized. The service host 204 might also generate entries in other types of logs 108 at operation 506. From operation 506, the routine 500 proceeds to operation 508, where the service host 204 that processed the request 104 at operation 504 might provide log data 114 related to the request 104 to the indexing service 112 in real time, or near-real time.

From operation 508, the routine 500 proceeds to operation 510, where the service host 204 will periodically store the generated log 108, or logs 108, in the log store 110. For example, the service host 204 might periodically commit the logs to the log store 110 once per hour or another time period. In such an embodiment, the indexing service 112 might be configured to retrieve the logs 108 from the log store 110 for indexing on a similar schedule. From operation 510, the routine 500 proceeds to operation 512, where it ends.

Figure 6:
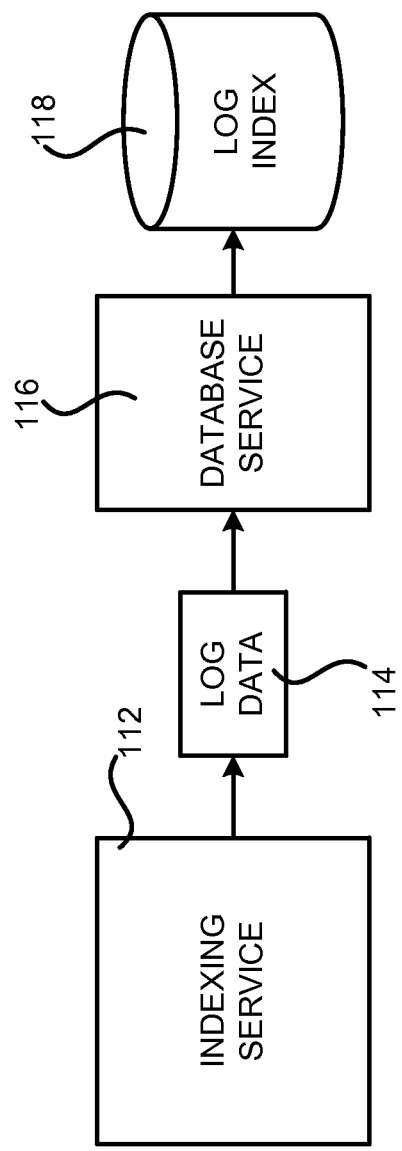
FIG. 6 is a system diagram showing additional details regarding the operation of an indexing service utilized to index log files generated by service hosts and a database service utilized to maintain the log index, according to one embodiment disclosed herein.

FIG. 6 is a system diagram showing additional details regarding the operation of the indexing service 112 utilized to index log files 108 generated by service hosts 204, and the database service 116 utilized to maintain the log index 118, according to one embodiment disclosed herein. As described briefly above, when the indexing service 112 identifies key values and other values in a log 108, the indexing service 112 provides the located log data 14 to a database service 116 for storage in the log index 118.

As also mentioned above, the log index 118 might be stored as a relational database, or another type of data store, that permits searching based upon the located key values. It should be appreciated that the relational database is provided by a distributed database service 116 in one embodiment disclosed herein. Other types of databases and data stores might also be utilized for storage of the log index 118.

Figure 7A:
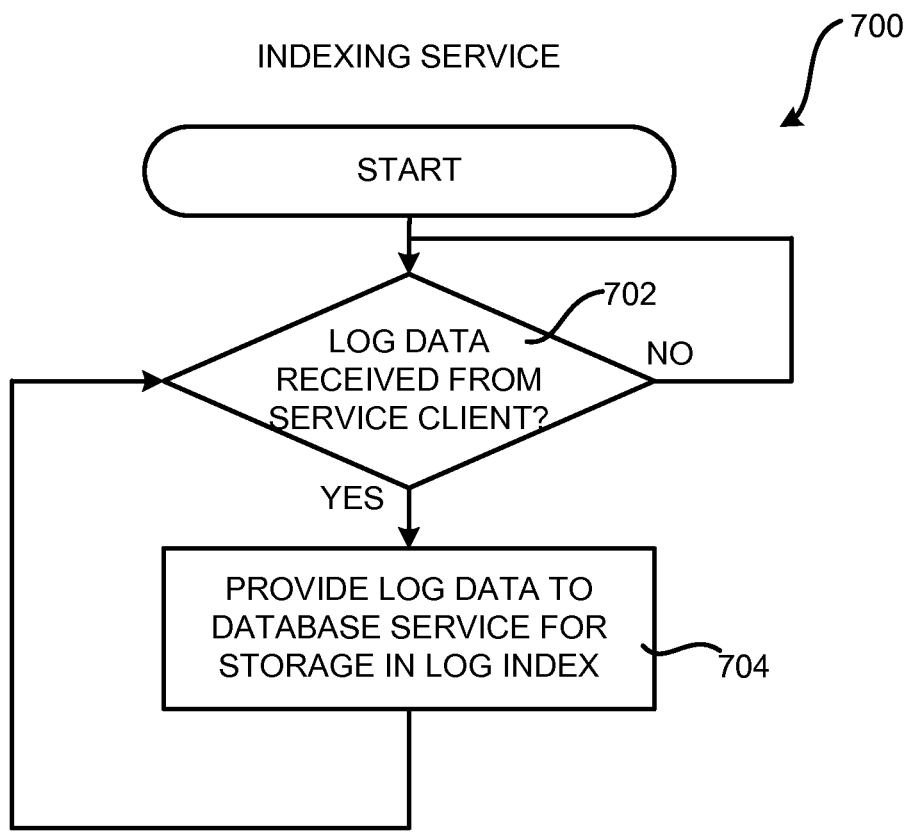
FIGS. 7A and 7B are flow diagrams showing several illustrative routines describing additional aspects of the operation of an indexing service, according to one embodiment disclosed herein.

Turning now to FIG. 7A, a flow diagram 700 will be described that illustrates aspects of the operation of the indexing service 112 in which service hosts 204 provide log data 114 to the indexing service 112 in real or near-real time. The routine 700 begins at operation 702, where the indexing service 112 determines whether a service host 204 has transmitted log data 114 directly to the indexing service 112 in real-time or in near-real time. If, at operation 702, the indexing service 112 determines that log data 114 has not been received directly from a service host 204, the routine 700 proceeds back to operation 702, where another such determination is made.

If, at operation 702, the indexing service 112 determines that it has received log data 114 from a service host 204, the routine 700 proceeds from operation 702 to operation 704. At operation 704, the indexing service 112 provides the log data 114 to the database service 116 for storage in the log index 118. In some implementations, it might be unnecessary for the indexing service 112 to index the log data 114 received from the service host 204 (i.e. the service host 204 provides the key value and any other values to be stored). In other implementations, the indexing service 112 might need to search the log data 114 provided by the service host 204 for key values and any other related values. From operation 704, the routine 700 proceeds to operation 706. From operation 704, the routine 700 proceeds back to operation 702, where additional log data 114 received from a service host 204 might be processed in a similar manner.

Figure 7B:
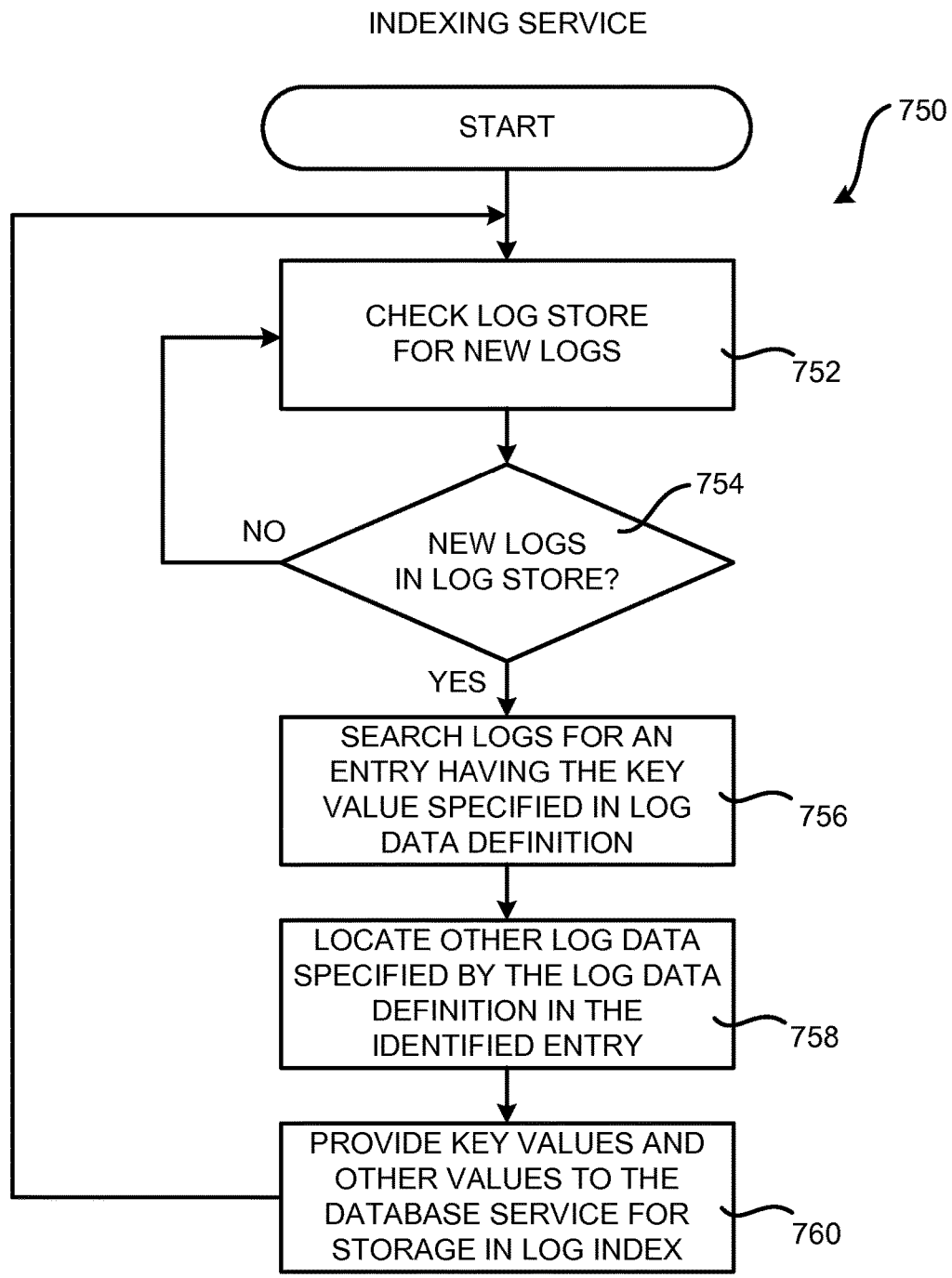

FIG. 7B shows a flow diagram 750 illustrating aspects of the operation of the indexing service 112 for periodically retrieving log files 108 from the log store 110 and processing the log files 108. The routine 750 begins at operation 752, where the indexing service 112 determines whether any new logs 108 have been stored in the log store 110. As mentioned above, the service hosts 204 might be configured to store new logs 108 in the log store 110 every hour or other time period. In this embodiment, the indexing service 112 might be configured to check the log store 110 for new logs 108 just after the time at which the service hosts 204 are configured to store the new logs 108. In other embodiments, the indexing service 112 might be configured to check the log store 110 for new logs on another type of schedule. The indexing service 112 might also receive a notification that new logs 108 are available in the log store 110.

If, at operation 752, the indexing service 112 determines that no new logs 108 are available in the log store 110, the routine 750 proceeds from operation 754 back to operation 752, described above. However, if new logs 108 are available, the routine 750 proceeds from operation 754 to operation 756. At operation 756, the indexing service 112 searches the new logs for entries 302 having the key values specified in the field 206B of the configuration settings file 113. The routine 750 then proceeds from operation 756 to operation 758.

If key values are located, the indexing service 112 searches the identified entries 302 for other values related to the located key values. As discussed above, the format of the other values to be located may also be identified by the field 206B of the configuration settings file 113.

From operation 758, the routine 750 proceeds to operation 760, where the indexing service 112 provides any located key values and other related values to the database service 116 for storage in the log index 118. The routine 750 then proceeds from operation 760 to operation 752, described above, where the operations discussed above may be repeated.

Figure 8:
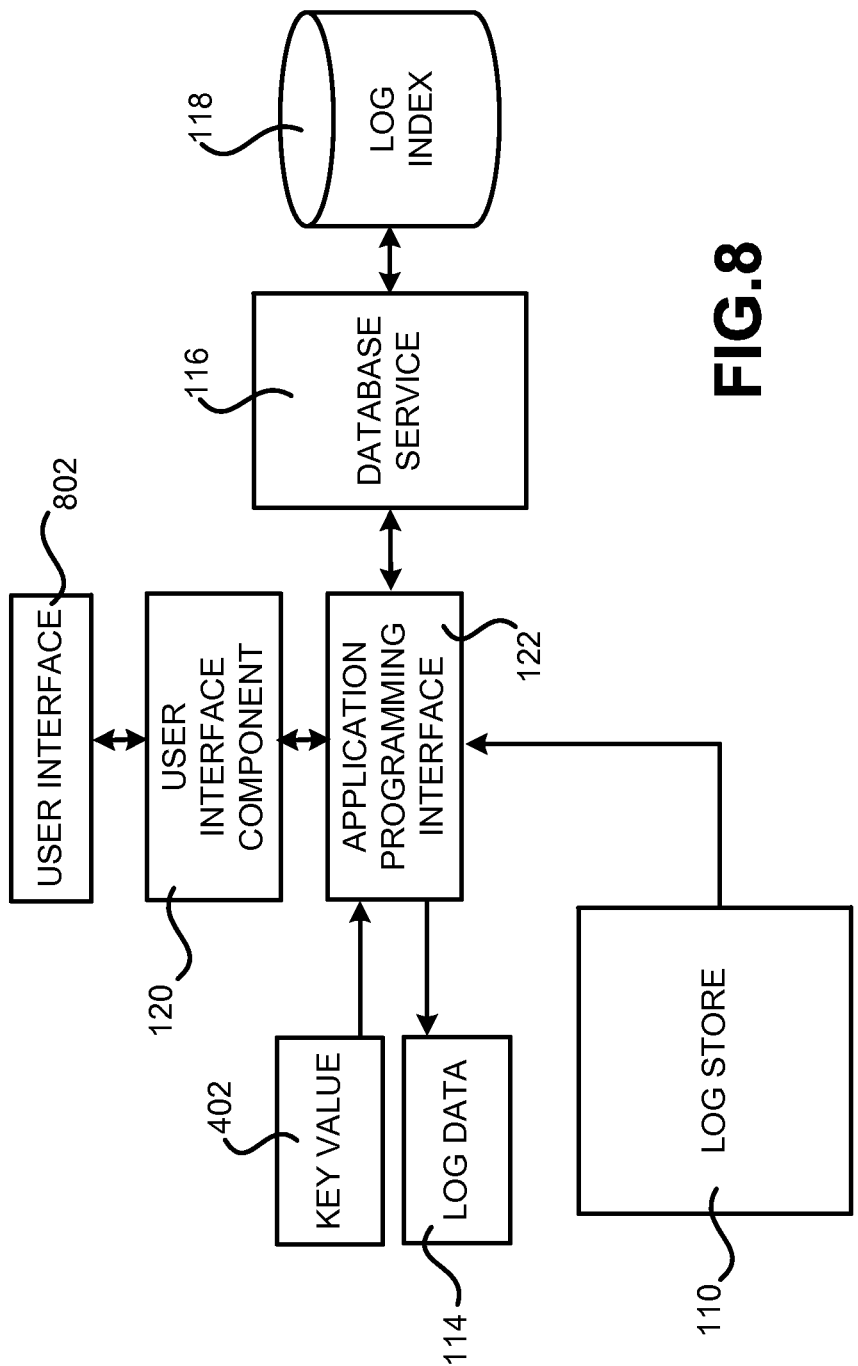
FIG. 8 is a system diagram showing details regarding the operation of a user interface component and an application programming interface that provide functionality for accessing the contents of the log index, according to one embodiment disclosed herein.

FIG. 8 is a system diagram showing details regarding the operation of a user interface component 120 and an API 122 that provide functionality for accessing the contents of the log index 118, according to one embodiment disclosed herein. As mentioned briefly above, in some implementations a user interface component 120 is provided for retrieving and presenting data stored in the log index 118. For example, the user interface component 120 might provide a user interface 802 through which a user may submit a key value. In one particular implementation, for instance, a user might provide a particular request ID of interest.

In response to receiving a key value, the user interface component 120 is configured to cause a search to be made of the log index 118 for the specified key value. If the key value is located in the log index 118, the user interface component 120 will present the other values stored in the log index 118 that have been associated with the supplied key value in the user interface 802. For instance, if a request ID is provided as the key value, the user interface component 120 might display the filename of the log file 108 in which the request ID was located, the host ID that processed the request associated with the request ID, the time at which the request associated with the request ID was processed, and/or the offset from the start of the log file to the location of the request ID. The user interface 802 might also provide other types of information.

In some embodiments, the user interface 802 also provides functionality for retrieving and displaying data from the log files 108 referenced by the key values stored in the log index 118. For example, the filename of a log file 108 stored in the log index 118 might be utilized to retrieve a log 108 from the log store 110. Similarly, an offset to a particular key value might be utilized to locate an entry 302 containing the key value. The user interface 802 can then display the contents of the located entry.

As will be described below, the user interface component 120 might also provide a user interface for viewing information from the log index 118 relating to summary performance metrics maintained by the service hosts 204 in one embodiment. Additional details regarding these aspects of the operation of the user interface component 120 will be provided below with regard to FIGS. 10 and 11.

In some implementations, an API 122 is also provided for retrieving values from the log index 118. For example, the API 122 might expose a method through which a key value 402 can be submitted to the API 122. In response to receiving a key value 402, the API 122 will cause the database service 116 to search the log index 118 for the specified key value 402. If the key value 402 is located in the log index 118, the API 122 will return the other values associated with the supplied key value 402 that are stored in the log index 118. The API 122 might also provide functionality for retrieving and providing relevant portions of a log 108 based upon a supplied key value 402. The API 122 might also provide other types of functionality in other embodiments. As illustrated in FIG. 8, the user interface component 120 might utilize the API 122 to retrieve data from the log index 118 and the log store 110.

Figure 9:
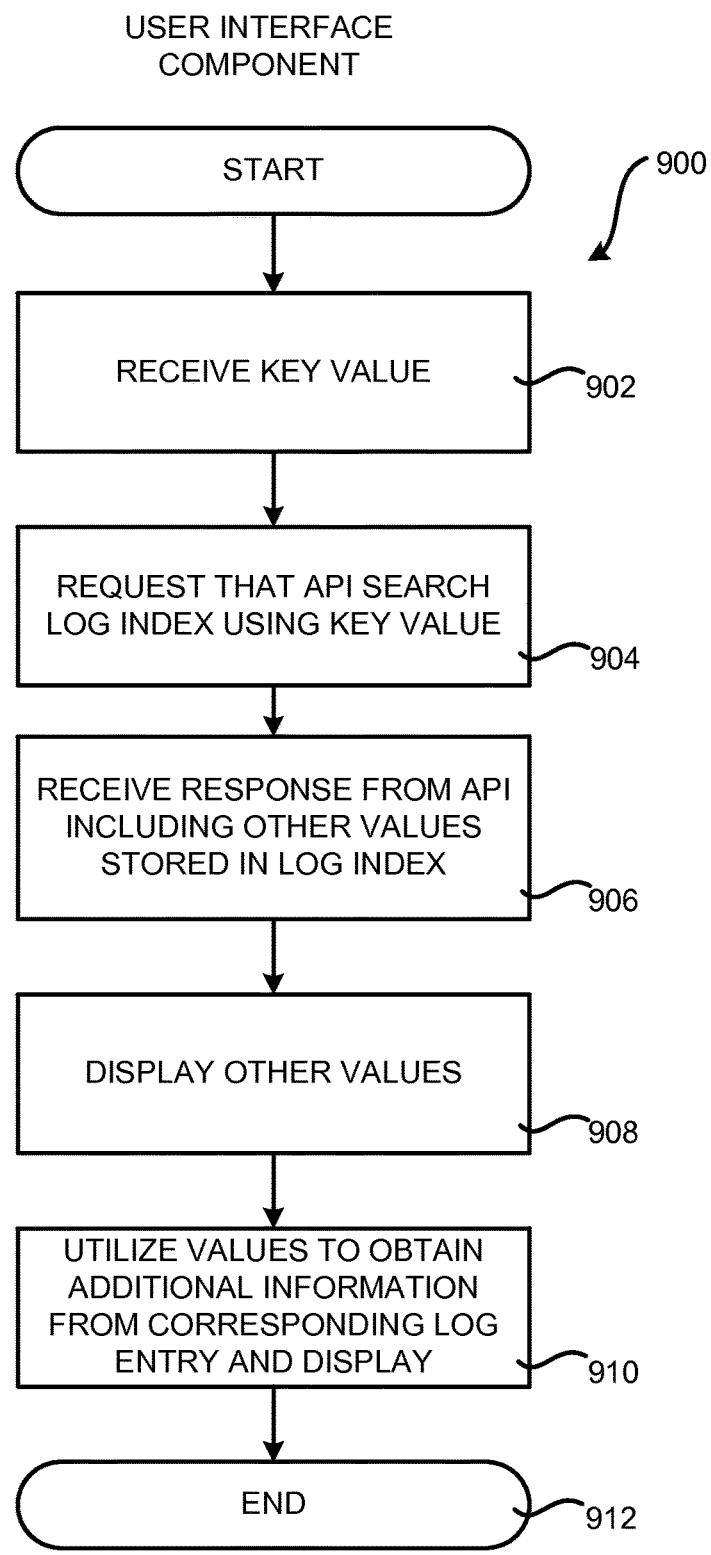
FIG. 9 is a flow diagram showing one illustrative routine describing additional aspects of a user interface component, according to one embodiment disclosed herein.

Turning now to FIG. 9, a flow diagram 900 will be described that illustrates aspects of the operation of the user interface component 120, according to one embodiment disclosed herein. The routine 900 begins at operation 902, where the user interface 802 receives a key value 402 from a user. In response to receiving the key value 402, the routine 900 proceeds from operation 902 to operation 904, where the user interface component 120 transmits a request to the API 122 to perform a search of the log index 118 for the key value 402 supplied through the user interface 802.

From operation 904, the routine 900 proceeds to operation 906, where the user interface component 120 receives a response to the search request from the API 122. The response might include one or more other values stored in the log index 118 that have been associated with the key value 402 in the manner described above. For example, the user interface component 120 might receive the filename of the log file 108 that includes the supplied key value 402. In response to receiving the other values, the routine 900 proceeds from operation 906 to operation 908, where the user interface 802 displays the other values.

From operation 908, the routine 900 proceeds to operation 910, where the user interface component 120 utilizes the received values to obtain additional information from the log files 108 using the API 122. For example, and as described above, the user interface component 120 might utilize the filename of the log 108 containing the supplied key value 402 to retrieve and display an entry 302 from the log file 108 that includes the key value 402. Other types of data might also be retrieved from the log files 108 and displayed in a similar manner. From operation 910, the routine 900 proceeds to operation 912, where it ends.

Figure 10:
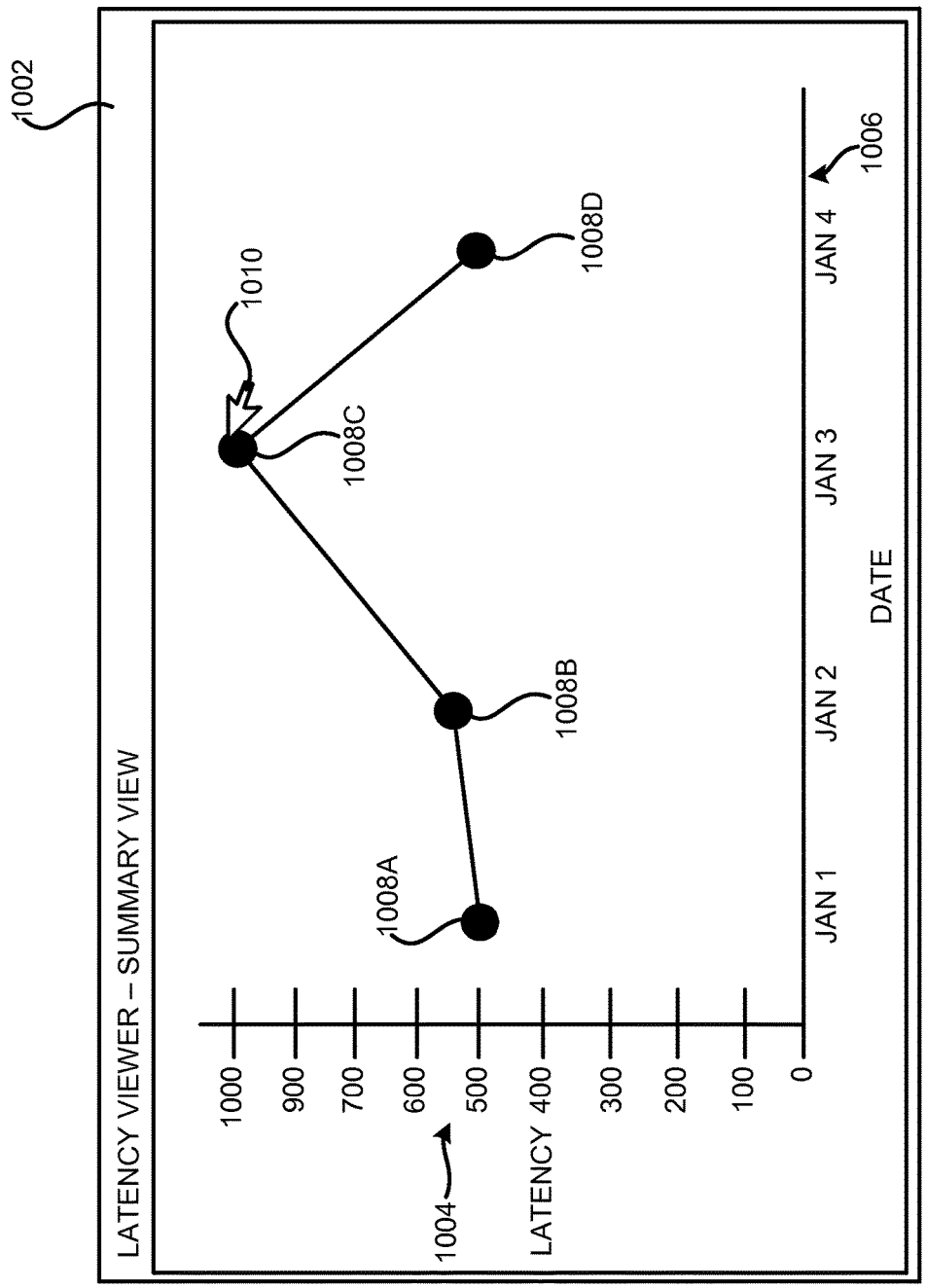
FIGS. 10 and 11 are user interface diagrams showing several illustrative user interfaces provided by the user interface component in one embodiment disclosed herein.
Figure 11:
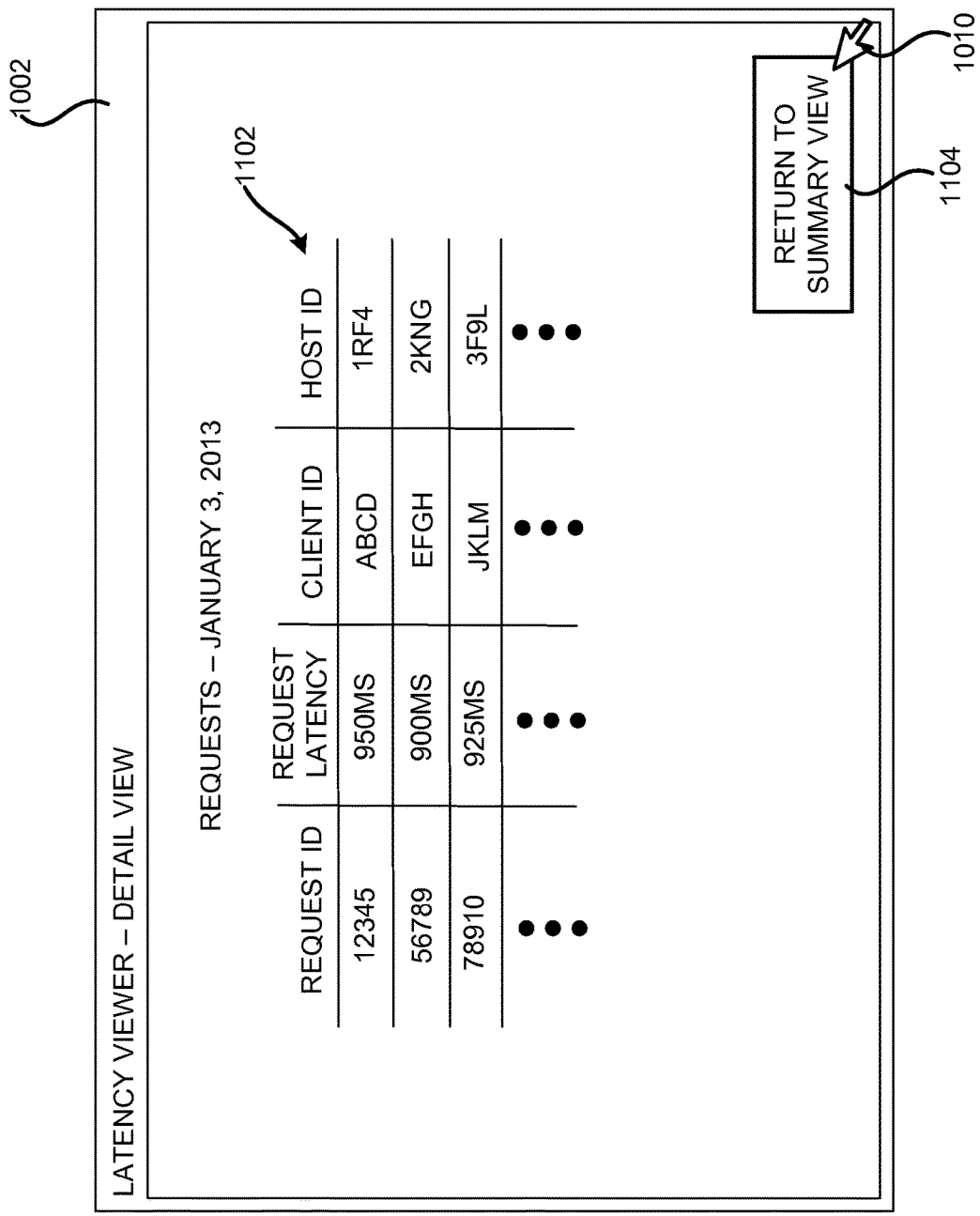

FIGS. 10 and 11 are user interface diagrams showing several illustrative user interfaces 1002 provided by the user interface component 120 in one embodiment disclosed herein. As illustrated in FIG. 10, the user interface component 120 might provide a user interface 1002 that provides summary data for certain performance metrics maintained by the service hosts 204. In the example shown in FIG. 10, for instance, the user interface component 120 has generated a user interface 1002 that includes an X-axis corresponding to a date that the metrics were collected and a Y-axis corresponding to the request processing latency.

The user interface 1002 shown in FIG. 10 also includes a number of plotted points 1008A-1008D corresponding to the average request latency on a particular date. For instance, in the example shown, the average request latency on "Jan 1", "Jan 2", and "Jan 4" was approximately 500 ms. The request latency on "Jan 3", however," was approximately 1000 ms, which may be indicative of some sort of issue with the service hosts 204 that processed requests on that day.

In order to allow an administrator of the large-scale service to quickly identify the service hosts 204 that contributed to the 1000 ms request latency experienced on "Jan 3", the user interface component 120 might provide functionality for allowing a user to utilize an appropriate user input device to select one of the points. For example, the user might utilize a mouse cursor 1010 to select the point 1008C as illustrated. The user might then "double click" or perform another action to select the point 1008C.

In response to a selection of the point 1008C, the user interface 1002 shown in FIG. 11 might be displayed. The user interface 1002 shown in FIG. 11 includes a table 1102 that includes data from one of the logs 108 from which the computation of the point 1008C, shown in FIG. 10, was derived. In order to generate the table 1102, the user interface component 120 might utilize request IDs for requests received on "Jan 3" as key values 402 to retrieve the values shown in the table 1102 from the log index 118. In this way, a user can quickly identify the various requests that contributed to the increased request latency indicated by the point 1008C in FIG. 10. When the user is finished reviewing the data shown in the table 1102, the user may select the user interface control 1104 to return to the user interface 1002 shown in FIG. 10.

It should be appreciated that the user interface 1002 shown in FIGS. 10 and 11 is merely illustrative and that other types of data contained in the log index 118 might also be presented in a similar manner. It should also be appreciated that the user interface controls and user input mechanisms described above are merely illustrative and that the user interface 1002 might be configured and controlled in other ways.

Figure 12:
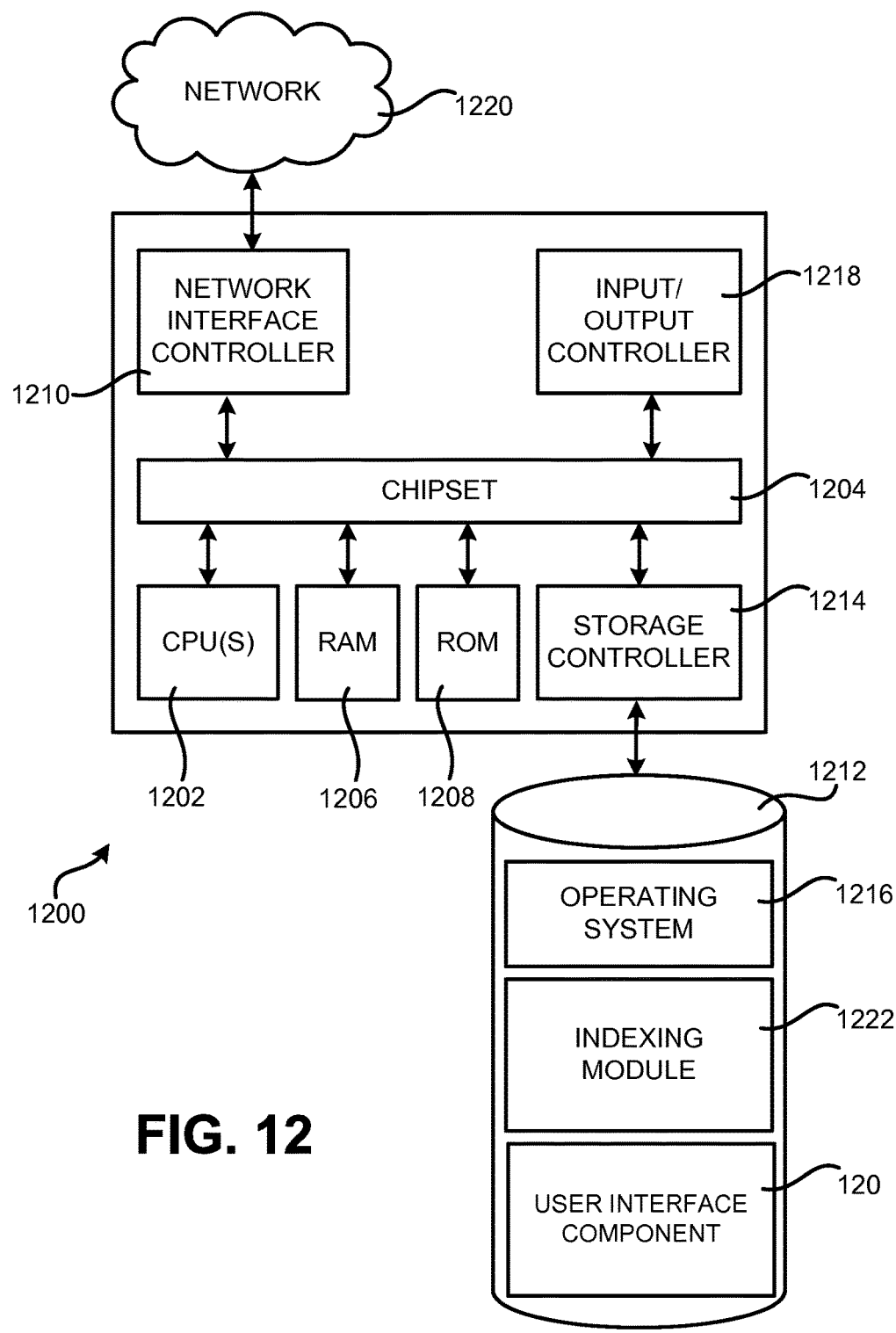
FIG. 12 is a computer architecture diagram showing one illustrative computer hardware architecture for use in computing devices configured to implement the technologies disclosed herein in one embodiment.

FIG. 12 shows an example computer architecture for a computer 1200 capable of executing the software components described herein for providing a large-scale log index in the manner presented above. The computer architecture shown in FIG. 12 illustrates a conventional server computer, workstation, desktop computer, laptop, electronic book reader, digital wireless phone, tablet computer, network appliance, set-top box, or other computing device. The computer architecture shown in FIG. 12 may be utilized to execute any aspects of the software components described above.

The computer 1200 includes a baseboard, or "motherboard," which is a printed circuit board to which a multitude of components or devices may be connected by way of a system bus or other electrical communication paths. In one illustrative embodiment, one or more central processing units ("CPUs") 1202 operate in conjunction with a chipset 1204. The CPUs 1202 are standard programmable processors that perform arithmetic and logical operations necessary for the operation of the computer 1200.

The CPUs 1202 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 1204 provides an interface between the CPUs 1202 and the remainder of the components and devices on the baseboard. The chipset 1204 may provide an interface to a random access memory ("RAM") 1206, used as the main memory in the computer 1200. The chipset 1204 may further provide an interface to a computer-readable storage medium such as a read-only memory ("ROM") 1208 or non-volatile RAM ("NVRAM") for storing basic routines that help to startup the computer 1200 and to transfer information between the various components and devices. The ROM 1208 or NVRAM may also store other software components necessary for the operation of the computer 1200 in accordance with the embodiments described herein.

According to various embodiments, the computer 1200 may operate in a networked environment using logical connections to remote computing devices and computer systems through a network, such as a local-area network ("LAN"), a wide-area network ("WAN"), the Internet, or any other networking topology known in the art that connects the computer 1200 to remote computers. The chipset 1204 includes functionality for providing network connectivity through a network interface controller ("NIC") 1210, such as a gigabit Ethernet adapter.

For example, the NIC 1210 may be capable of connecting the computer 1200 to other computing devices over a network 1220, such as a local area network ("LAN") or a wide area network ("WAN") such as the Internet. It should be appreciated that multiple NICs 1210 may be present in the computer 1200, connecting the computer to other types of networks and remote computer systems.

The computer 1200 may be connected to a mass storage device 1212 that provides non-volatile storage for the computer. The mass storage device 1212 may store system programs, application programs, other program modules, and data, which have been described in greater detail herein.

The mass storage device 1212 may be connected to the computer 1200 through a storage controller 1214 connected to the chipset 1204. The mass storage device 1212 may consist of one or more physical storage units. The storage controller 1214 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 1200 may store data on the mass storage device 1212 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1212 is characterized as primary or secondary storage, or the like.

For example, the computer 1200 may store information to the mass storage device 1212 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1212 by detecting the physical states or characteristics of one or more particular locations within the physical storage units.

In addition to the mass storage device 1212 described above, the computer 1200 might have access to other computer-readable media to store and retrieve information, such as program modules, data structures, or other data. It should be appreciated by those skilled in the art that computer-readable media can be any available media that may be accessed by the computer 1200, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 1212 may store an operating system 1216 utilized to control the operation of the computer 1200. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 1212 may store other system or application programs and data utilized by the computer 1200. For instance, when utilized to implement the indexing service 112, the mass storage device 1212 may store an indexing module 1222 for providing the functionality described above. The mass storage device 1212 might also store the user interface component 120 and other software components which, when executed by the CPUs 1202, cause the computer 1200 to perform the various operations described above.

In one embodiment, the mass storage device 1212 or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1202 transition between states, as described above. According to one embodiment, the computer 1200 has access to computer-readable storage media storing computer-executable instructions that, when executed by the computer, perform the various routines and operations described herein.

The computer 1200 may also include an input/output controller 1218 for receiving and processing input from a number of input devices, such as a keyboard, a mouse, a touchpad, a touch screen, an electronic stylus, or other type of input device. Similarly, the input/output controller 1218 may provide output to a display device, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that technologies for providing and utilizing a large-scale log index have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system for providing an index for a plurality of log files, the system comprising:
    two or more service hosts, wherein individual hosts of the two or more service hosts are configured to:
        process requests received from one or more client devices,
        generate log data describing the processing of the requests, and store the log data in the plurality of log files;
    an indexing service configured to:
        obtain at least a first log file from a first service host of the two or more service hosts and a second log file from a second service host of the two or more service hosts, and
        generate the index for the plurality of log files, wherein generating the index comprises:
            searching the first log file and the second log file for one or more key values specified in a configuration settings file,
            searching the first log file and the second log file for one or more other values associated with the one or more key values; and
            generating, based at least in part on the one or more key values specified in the configuration settings file and the one or more other values, one or more first index log entries associated with the first log file and one or more second index log entries associated with the second log file;
    a database service configured to:
        receive, from the indexing service, the one or more first index log entries and the one or more second index log entries, and
        store the one or more first index log entries and the one or more second index log entries other values in a log index; and
    a user interface component configured to:
        receive an input comprising a key value, cause the database service to perform a search of the log index based on the key value, and display one or more other values associated with the key value of the received input, wherein the one or more other values are identified in the search.

2. The system of claim 1, wherein the two or more service hosts are further configured to store the plurality of log files in a distributed log store, and wherein the indexing service is configured to periodically retrieve individual log files of the plurality of log files from the distributed log store.

3. The system of claim 1, wherein the two or more service hosts are further configured to provide the log data directly to the indexing service in real time.

4. The system of claim 1, wherein the configuration settings file further comprises a time to live (TTL) value for the data stored in the log index, and wherein the indexing service is further configured to periodically cause log data to be removed from the log index based upon the TTL value.

5. The system of claim 1, wherein the system further comprises an application programming interface (API) for retrieving the other values from the log index using the key value.

6. The system of claim 1, wherein the user interface component is further configured to:
    display summary data for one or more performance metrics maintained by the two or more service hosts;
    receive a selection of a data point in the summary data;
    in response to receiving the selection of the data point in the summary data, retrieve one or more other values from the log index relating to a computation of the data point; and
    displaying the retrieved one or more other values.

7. The system of claim 1, wherein each of the requests received from the client devices includes a unique request identifier (ID), wherein the key value comprises the request ID, and wherein the other values comprise a filename of a log file in which a request ID is found, a host ID for a service host that processed a request, a time at which a request was processed, and an offset to a log entry in the log file for a request.

8. The system of claim 1, wherein each of the requests received from the client devices includes a unique request identifier (ID), wherein the key value comprises the request ID, and wherein the other values comprise a request latency, a host ID for a service host that processed a request, and a time at which a request was processed.

9. A non-transitory computer-readable storage medium having computer-executable instructions stored thereupon which, when executed by a computer, cause the computer to:
    receive at least a first log file from a first service host and a second log file from a second service host;
    generate one or more first index log entries associated with the first log file and one or more second index log entries associated with the second log file, wherein the generating comprises:
        searching the first log file and the second log file for entries containing a key value, wherein the key value is specified in a configuration settings file;
        in response to identifying an entry in the first log file containing the key value;
            searching the entry in the first log file containing the key value for one or more other values associated with the key value; and
            generating, based at least in part on the key value specified in the configuration settings file and the one or more other values associated with the key value, the a first index log entry associated with the first log file; and
        in response to identifying an entry in the second log file containing the key value:
            searching the entry in the second log file containing the key value for one or more other values associated with the key value; and
            generating, based at least in part on the key value specified in the configuration settings file and the one or more other values associated with the key value, the a second index log entry associated with the second log file; and
    storing the one or more first index log entries and the one or more one or more second index log entries in a log index.

10. The non-transitory computer-readable storage medium of claim 9, wherein the key value and the one or more other values are defined by regular expressions stored in the configuration settings file.

11. The non-transitory computer-readable storage medium of claim 9, wherein one or more log files are periodically retrieved from a distributed log store.

12. The non-transitory computer-readable storage medium of claim 9, wherein the first log file is generated by a first service host and the second log file is generated by the second service host.

13. The non-transitory computer-readable storage medium of claim 9, having further computer-executable instructions stored thereupon which, when executed by the computer, cause the computer to:
    receive log data from one or more service hosts in real time; and
    store the log data received from the one or more service hosts in the log index.

14. The non-transitory computer-readable storage medium of claim 9, wherein the key value comprises a request identifier (ID) associated with a request processed by one of the first service host or the second service host.

15. The non-transitory computer-readable storage medium of claim 14, wherein one of the one or more other values comprises a filename of a log file containing the request ID.

16. A computer-implemented method for providing a log index, the method comprising executing instructions in a computer system to perform operations including:
    obtaining one or more log files generated by service hosts from a log store;
    generating one or more first index log entries associated with a first log file of the one or more log files and one or more second index log entries associated with a second log file of the one or more log files, wherein the generating comprises:
        searching the one or more log files for a key value specified in a configuration settings file;
        in response to locating the key value in an entry of the first log file:
            retrieving one or more other values associated with the key value from the entry of the first log file; and
            generating, based on the key value specified in the configuration settings file and the one or more other values, a first index log entry associated with the first log file; and
        in response to locating the key value in an entry of the second log file:
            retrieving one or more other values associated with the key value from the entry of the second log file; and
            generating, based on the key value specified in the configuration settings file and the one or more other values, a second index log entry associated with the second log file; and
    storing the one or more first index log entries and the one or more second index log entries in a log index.

17. The computer-implemented method of claim 16, further comprising removing the one or more first index log entries and the one or more one or more second index log entries from the log index based upon a time to live (TTL) value associated with at least one of the key values or the one or more other values.

18. The computer-implemented method of claim 16, further comprising providing an application programming interface (API) for retrieving the one or more first index log entries from the log index using the key value.

19. The computer-implemented method of claim 16, further comprising:
    providing a user interface configured to receive the key value, and in response to receiving the key value, to utilize the log index to locate one or more relevant log files having the key value stored therein.

20. The computer-implemented method of claim 16, further comprising:
    providing a user interface configured to display summary data for one or more performance metrics maintained by the service hosts;
    receiving a selection of a data point in the summary data by way of the user interface;
    in response to receiving the selection of the data point in the summary data, retrieving the one or more other values from the log index relating to a computation of the data point; and
    displaying the retrieved one or more other values.

* * * * *